(12) United States Patent
Morcom et al.

(10) Patent No.: US 12,081,411 B1
(45) Date of Patent: Sep. 3, 2024

(54) INTERNAL NETWORK ENUMERATION TOOL

(71) Applicant: The United States of America as represented by the Secretary of the Navy, Newport, RI (US)

(72) Inventors: Christopher J Morcom, Newport, RI (US); Nathaniel C Couch, Portsmouth, RI (US)

( * ) Notice: Subject to any disclaimer, the term of this patent is extended or adjusted under 35 U.S.C. 154(b) by 0 days.

(21) Appl. No.: 18/123,390

(22) Filed: Mar. 20, 2023

(51) Int. Cl.
*H04L 41/14* (2022.01)
*H04L 9/08* (2006.01)

(52) U.S. Cl.
CPC ............ *H04L 41/145* (2013.01); *H04L 9/088* (2013.01)

(58) Field of Classification Search
CPC ............................. H04L 41/145; H04L 9/088
See application file for complete search history.

(56) References Cited

U.S. PATENT DOCUMENTS

2006/0168180 A1* 7/2006 Black .................. H04L 69/40
709/223
2007/0245033 A1* 10/2007 Gavrilescu ............ H04L 43/12
709/230
2011/0173320 A1* 7/2011 Black .................... H04L 69/40
709/224

FOREIGN PATENT DOCUMENTS

WO    WO-2007070291 A1 *  6/2007  ............. H04L 41/12

* cited by examiner

*Primary Examiner* — Cheikh T Ndiaye
(74) *Attorney, Agent, or Firm* — James M. Kasischke; Michael P. Stanley; Jeffry C. Severson

(57) ABSTRACT

A method for network infrastructure assessment is provided. An assessor tool portion is replicated on a network origination node. A plurality of authentication keys associated with a root authentication key are generated. Network nodes are recursively enumerated by the assessor tool. In the recursion, information on the parent node is enumerated and reported to a controller of the network; the parent node is marked as enumerated; child nodes connected to the parent node are detected; at least a portion of the assessor tool is replicated on a child node that is not enumerated but has a valid assigned authentication key; and recursion is continued with the child node as the parent node. The reported information is processed to produce a network infrastructure assessment.

22 Claims, 7 Drawing Sheets

INTERNAL NETWORK ENUMERATION TOOL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present disclosure relates to a network. More particularly, the present disclosure relates to infrastructure assessment of a network.

(2) Description of the Prior Art

In a computer network, a node (or, equivalently, a host) is any addressable device, hardware or software, virtualized or physical, that allows operator interaction via an operating system interface. Such a node may be placed in a network of nodes. A network operator may desire to obtain on-demand or real-time accurate views of infrastructure information present in the nodes of a network. This information may be, for example, one or more IP (Internet Protocol) addresses, operating system information, open ports, network graphs and topologies, etc. More particularly, the information may include one or more node names (hostnames), node states, parent nodes, adjacent nodes, network interfaces/VLANs (Virtual Local Area Networks), running services/listening addresses, firewall rules, ACLs (Access Control Lists), active hardware ports, web server configurations, users and their permissions, etc. The network operator may also wish to detect the presence of any uncredentialed, unauthorized and/or malevolent nodes in the network.

Network infrastructure assessment tools (hereinafter "assessor tools"), e.g., Nessus®, Nmap, Mass can, and Metasploit® Framework modules, exist to provide at least some of this information. Unfortunately, information provided by these tools is often not accurate.

SUMMARY OF THE INVENTION

The present disclosure provides a method for network infrastructure assessment. At least a portion of an assessor tool is replicated on an origination node of a network. A plurality of authentication keys associated with a root authentication key are generated. Network nodes are recursively enumerated by the assessor tool. In the recursion, information on the parent node is enumerated and reported to a controller of the network; the parent node is marked as enumerated; child nodes connected to the parent node are detected; at least a portion of the assessor tool is replicated on a child node that is not enumerated but has a valid assigned authentication key; and recursion is continued with the child node as the parent node. The reported information is processed to produce a network infrastructure assessment.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
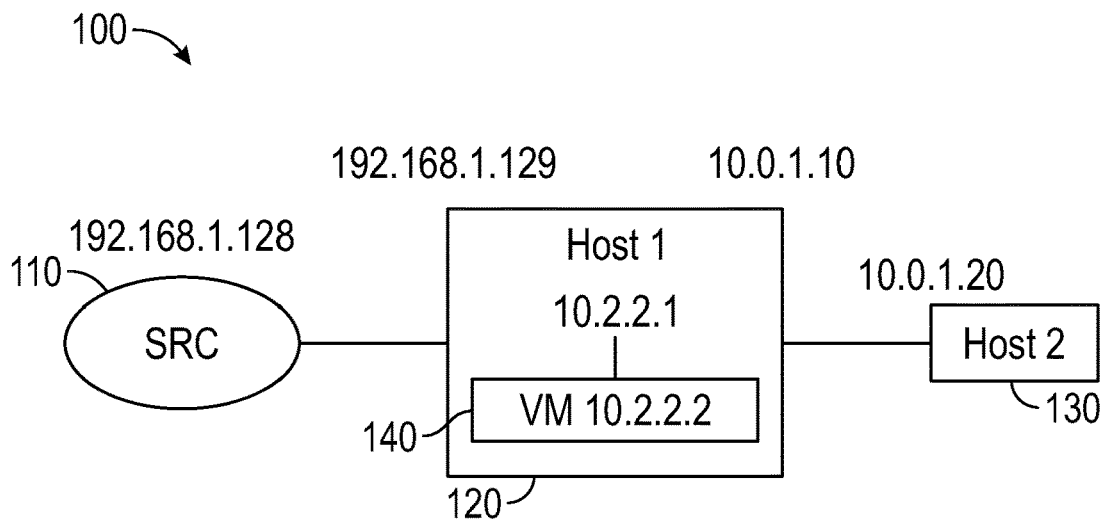
FIG. 1 depicts network connections, in accordance with an embodiment of the present disclosure.

Embodiments of the present disclosure will now be described with reference to the drawing figures, in which like reference numerals refer to like parts throughout.

Embodiments of the present disclosure advantageously provide a method and assessor tool for network infrastructure assessment. More particularly, embodiments of the present disclosure advantageously provide an assessor tool that assures accurate information is returned to the network operator.

In one embodiment, a method for computer network infrastructure assessment includes a software assessor tool. At least a portion of the assessor tool is replicated on an origination node of a plurality of nodes of a network; the origination node is a parent node of the plurality of nodes; and the portion of the assessor tool on the origination node is configured to generate a plurality of authentication keys associated with a root authentication key. Recursively, for one or more nodes of the plurality of nodes, the assessor tool enumerates information on the parent node and reports the enumerated information to a controller of the network associated with an oldest enumerated node of the network and to one or more adjacent nodes of the parent node; marks the parent node as enumerated; detects child nodes connected to the parent node; and, responsive to a determination that a child node is not enumerated and that the child node possesses a valid assigned authentication key associated with at least one of the plurality of authentication keys, replicates at least a portion of the assessor tool on the child node and continues recursion with the child node as the parent node. At least a portion of the enumerated information is processed to produce an infrastructure assessment of the network.

The processed enumerated information may be used to produce, e.g., a network infrastructure assessment. The network infrastructure assessment may be, e.g., a network graph that includes a number of states of at least one enumerated node of the one or more nodes of the network, as described infra.

Generally, networks may have a specially designated node. Such a node may be termed, inter alia, a root node, a primary node, or an origination node. In this document, the specially designated node shall be termed the origination node. To be in the network, a node must have a communication path (via one or more communication hops, i.e., either directly or via relays by other network nodes) to the origination node. A parent node, or parent, is the node adjacent to a given node on the path to the origination node. A child node, or child, is a node adjacent to a node that is closer to the root node. (The node closer to the root node would be the child's parent node.) As in biology, these terms may not be exclusive; a given node may be a child of a second node and a parent of a third node. Also analogous to biology, while all network nodes have a parent (except for the origination node), not all nodes have children; a node without children is considered a child.

In cases where there are multiple paths from a given node to the origination node, in general, traversal order is used to determine parent-child relationships.

Importantly, the disclosed assessor tool enumerates nodes across a network internally by using credentials for remote login/access to networked system elements provided by an operator. This enables the tool to enumerate information using local access on the node, which will provide guaranteed accurate results under the assumption that devices are given administrative credentials. By enumerating the network in this manner, additional VLANs to which networked devices may be connected may also be discovered, should such interfaces exist. Nodes may also be discovered by circumventing firewalls that may block enumeration from outside the source host as well. This includes the ability to map virtual machines connected via host-only interfaces.

To fully enumerate a network in this manner, and according to an embodiment, a controller external to the network (a "source host") is coupled to an origination node of the network (a host node). Code (i.e., at least a portion of the assessor tool) is sent from the controller to network nodes via the source host. This code captures information the operator would like to enumerate. The code then acts to propagate information back to the source host, and then the code replicates itself on adjacent devices. The source host and the network nodes are effectively running the same code; the code running on the nodes propagates through the network. The originating address is provided with the code to each node, enabling each node to send information back to the source host.

FIG. 1 depicts an example network 100 in accordance with an embodiment. In example network 100, source host 110 ("SRC") is connected to origination host 120 ("Host 1"), and origination host 120 is connected to second host 130 ("Host 2"). Source host 110 comprises interface 192.168.1.128. Origination host 120 comprises interfaces 10.2.2.1, 10.0.1.10, and 192.168.1.129, and hosts virtual machine 140 ("VM"). Virtual machine 140 comprises interface 10.2.2.2. Second host 130 comprises interface 10.0.1.20. In example network 100, second host 130 is a child node of origination host 120, and origination host 120 is a parent node of second host 130. In operation, source host 110 initiates the assessor tool, which connects to origination host 120 over the 192.168.1.129 IP address. Because the assessor tool enumerates the internals of origination host 120, the 10.2.2.1 and 10.0.1.10 interfaces become known to source host 110. Importantly, once assessor tool code is running on origination host 120, the link between source host 110 and origination host 120 may be broken without loss of collected network infrastructure information, as this information will still reside in (and be updated by) origination host 120 and will be available should the link between source host 110 and origination host 120 be reestablished.

Figure 2:
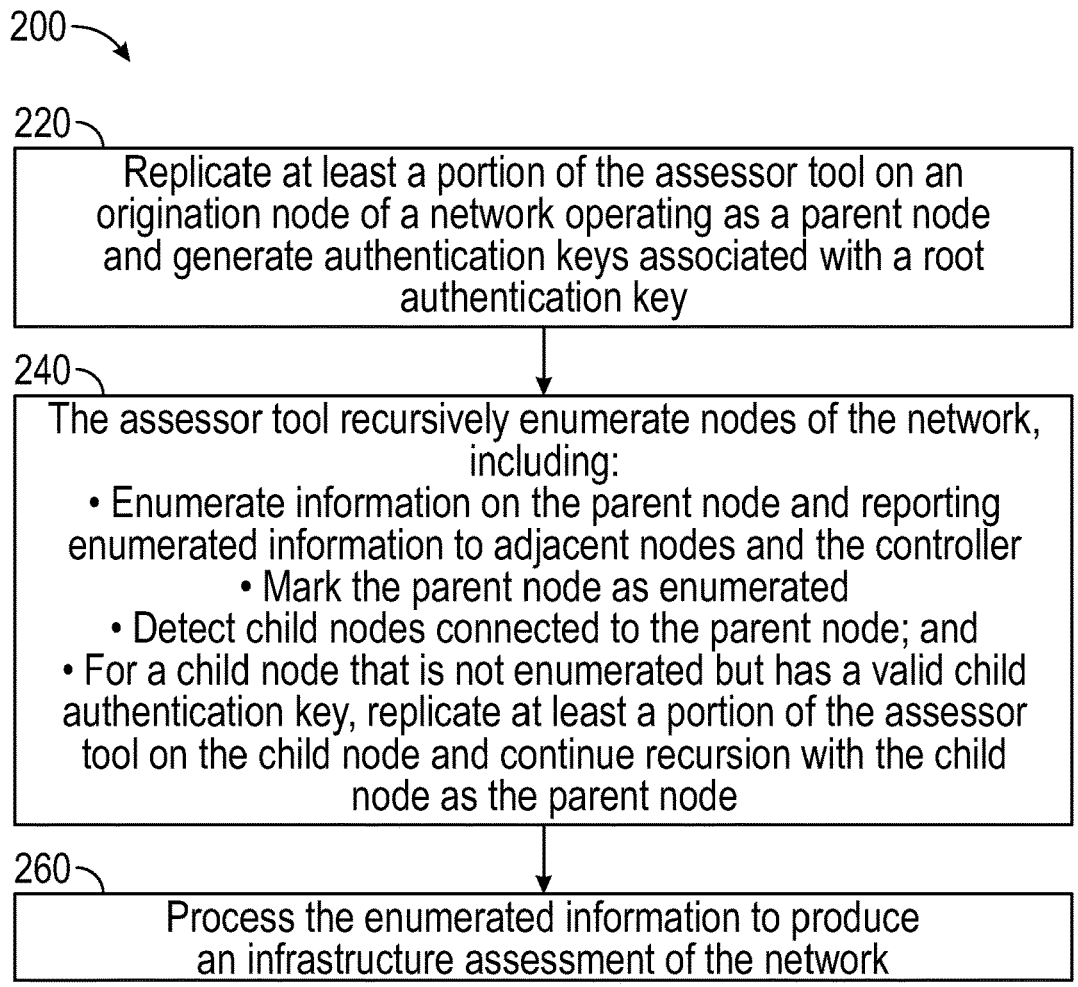
FIG. 2 depicts a network infrastructure assessment flow diagram, in accordance with an embodiment of the present disclosure.

FIG. 2 depicts network infrastructure assessment flow diagram 200, in accordance with an embodiment of the present disclosure. At 220, replicate at least a portion of an assessor tool on an origination node of a network, operating as a parent node. Generate a plurality of authentication keys associated with a root authentication key. The root authentication key is from a root certificate authority. In an embodiment, the authentication keys are dynamic (i.e., they change with each session of use of the assessor tool).

At 240, recursively enumerate nodes of the network by the assessor tool. In this recursion, enumerate information on the parent node and report to a controller of the network associated with an oldest enumerated node of the network and to one or more adjacent nodes of the parent node; mark the parent node as enumerated; detect child nodes connected to the parent node; replicate at least a portion of the assessor tool on a child node that is not enumerated but has a valid assigned authentication key associated with at least one of the plurality of authentication keys; and recursion is continued with the child node as the parent node. The desired information is reported to one or more adjacent nodes of the parent node for reliability purposes, as these nodes provide both redundant paths to the controller and redundant storage of the information. At the conclusion of this recursion, all reachable nodes (i.e., all nodes that have a communication path to the controller, as described below) are enumerated.

At 260, the enumerated information received by the controller is processed. This processing may be performed in part or in whole at the controller, or the controller may send unprocessed or partially-processed information to a site removed from the controller (e.g., cloud-based processing). As described below, the unprocessed or processed information may be stored in the network and/or an external database. In service mode, the assessor tool may, e.g., build a network graph of the network using at least a portion of the enumerated information.

Figure 3:
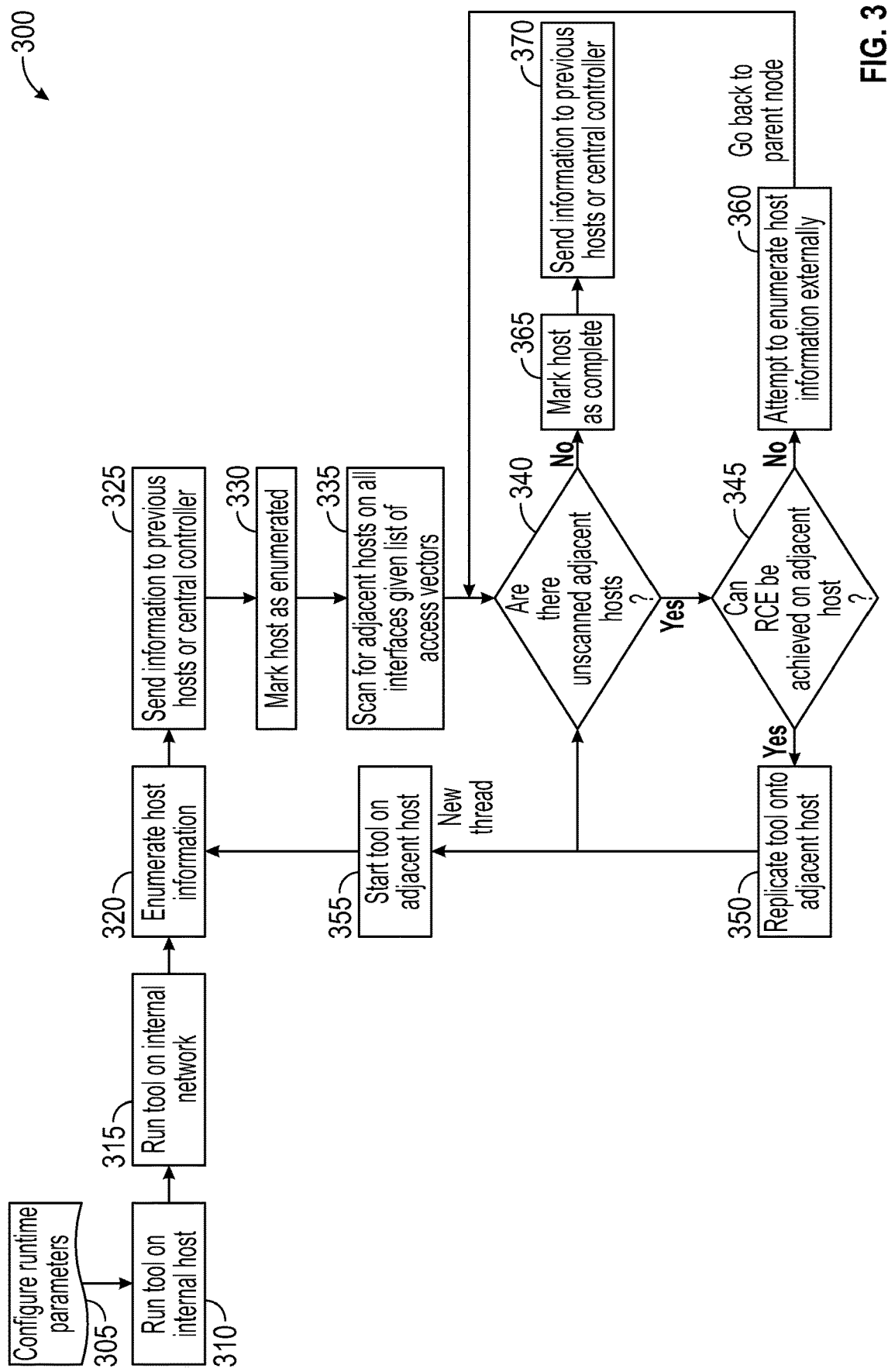
FIG. 3 depicts a network infrastructure assessment flow diagram, in accordance with an embodiment of the present disclosure.

FIG. 3 depicts a network infrastructure assessment flow diagram 300, in accordance with an embodiment. At 305, runtime parameters are configured. These parameters are set by the operator and include, for example, desired information for enumeration; a duration without message reception from the controller, after which a determination is made that the node is isolated and running code should terminate and cleanup be initialized; the number of propagation steps from the source host; node access vectors; node credentials and signatures; and nodes that are out-of-scope (i.e., not to be included in the network). Importantly, runtime parameters may be changed while the network scan is being performed. It is not necessary to stop and then restart the scan should a parameter be changed. This time-saving feature is useful in many applications.

At 310, the assessor tool is run on the controller (internal host). Operator inputs, such as desired run configuration (e.g., service or standalone configuration) and the runtime parameters, are accessed and acted upon.

At 315, the assessor tool is started on the internal network. At least a portion of the assessor tool is replicated and inserted into the network, at the origination node, from the controller. Also inserted is a root authentication key from a root certificate authority. The assessor tool uses the root authentication key to generate dynamic host authentication keys. (The keys expire after a fixed time after first use. To ensure both parent and child hosts always have a valid authentication key, the keys are regenerated before their expiration, then redistributed across the network.) In an embodiment, if the assessor tool is configured in service mode, and a valid security credential is already present on host nodes, host authentication keys are generated based on the existing security credential. If the assessor tool is configured in standalone mode, and an existing security credential is not already present on host nodes, a security credential is forwarded to the parent node and host authentication keys are generated based on the forwarded security credential.

At 320, host information is enumerated by the assessor tool. The desired host infrastructure information is a runtime parameter, and some examples of the types of information that may be enumerated are described below. At 325, the assessor tool sends the enumerated information to previous or adjacent hosts for eventual relay to the controller or directly to the controller itself. At 330, the host of the assessor tool is marked as enumerated. The assessor tool also sends this information to previous hosts and/or directly to the controller. At 335, the assessor tool scans for adjacent hosts on all interfaces for which it has been given access vectors. The access vectors are sent to the host from the controller, if they are known—i.e., if there is previous information available on the network.

At 340, if any unscanned adjacent hosts have been detected, flow continues to 345. If no unscanned adjacent hosts have been detected, flow continues to 365. (If no unscanned adjacent hosts have been detected, and no child nodes of the parent node are present, the parent node is a child node of the network.)

At 365, the assessor tool marks the host as complete. Being complete means that the host's scanning is complete, and all adjacent hosts have been enumerated.

At 370, the tool reports that the current host of the assessor tool is complete to the parent, previously-enumerated (i.e., adjacent) hosts, or the controller directly (as appropriate).

At 345, if RCE (remote code execution) can be achieved on the unscanned adjacent host, flow continues to 350. If remote code execution cannot be achieved, flow continues to 360. This determination may be achieved by, e.g., determining if the child possesses a valid authentication key (e.g., a certificate signed by a trusted certificate authority), before the expiration time of the key.

At 360, the tool attempts to enumerate the unscanned adjacent host externally, i.e., without running code on the adjacent host. After this attempt, focus returns to the parent node and flow returns to 340.

At 350, the tool replicates at least a portion of the assessor tool on the identified unscanned adjacent (child) host. For the assessor tool instantiation on the parent, flow returns to 340. For the assessor tool instantiation on the child (the newly-replicated instantiation; the new thread), flow continues to 355. This flow bifurcation creates nondeterministic recursion in the distribution of the assessor tool replication process, ensuring that all network nodes that have a communication path to the controller will be identified, and their infrastructure information received at the controller asynchronously. Replicating at least a portion of the assessor tool on the child node provides the child node with an address of the controller; this process ensures that each child of each parent in the network can report associated enumerated information to the address of the controller.

At 355, the assessor tool is started on the adjacent host. Flow returns to 320.

According to an embodiment, the assessor tool utilizes root privileges to allow replication of a subset of the tool's code onto every device in the network, and is designed to operate in a hybrid centralized and decentralized manner. For centralized control, when the tool replicates code onto a node, the address of the source host or controller becomes known to the node and information is propagated to the source host address. Nodes that cannot communicate directly with the source host are required to operate in a decentralized manner where information is propagated to the parent node that scanned it first. Another approach is necessary for handling monodirectional links where the parent node can communicate with the child node but not vice-versa. In this case, the child node identifies adjacent nodes in the network that have a path to the source host and establishes its own path back to the source host via one of these adjacent nodes. The only unmappable case would be if there was no link back to the source through adjacent nodes. In this case, the source host will not see the child node.

Figure 4:
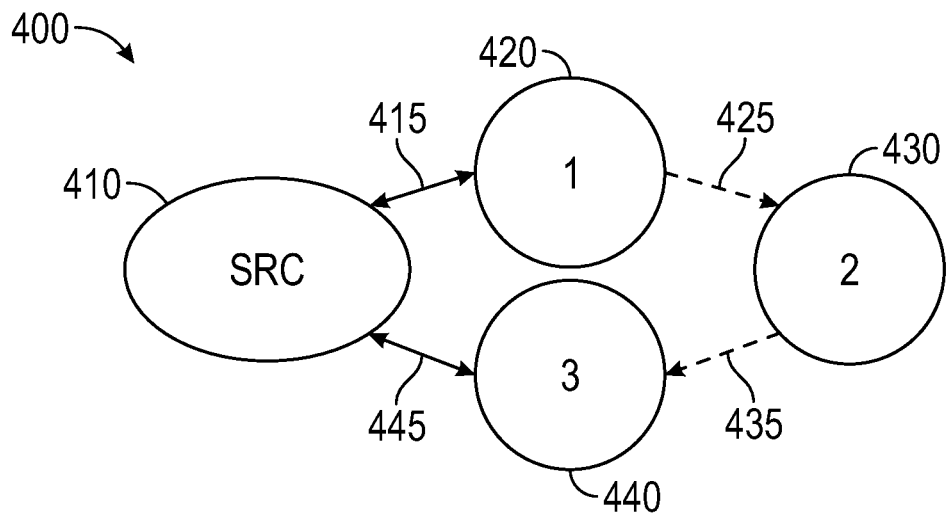
FIG. 4 depicts communication to a source host via an alternative path, in accordance with an embodiment of the present disclosure.

As an example of the monodirectional link case, FIG. 4 depicts communication to a source host via an alternative path, in accordance with an embodiment of the present disclosure.

In network 400 of FIG. 4, source host 410 ("SRC") is coupled to origination node 420 via bidirectional link 415, and to third node 440 via bidirectional link 445. Second node 430 is coupled to origination node 420 (its parent) via incoming monodirectional link 425, and to third node 440 via outgoing monodirectional link 435.

As a child node of origination node 420 connected by monodirectional link 425, second node 430 cannot communicate to source host 410 via its parent. However, it discovers a path to source host 410 via third node 440, using monodirectional link 435.

Figure 5A:
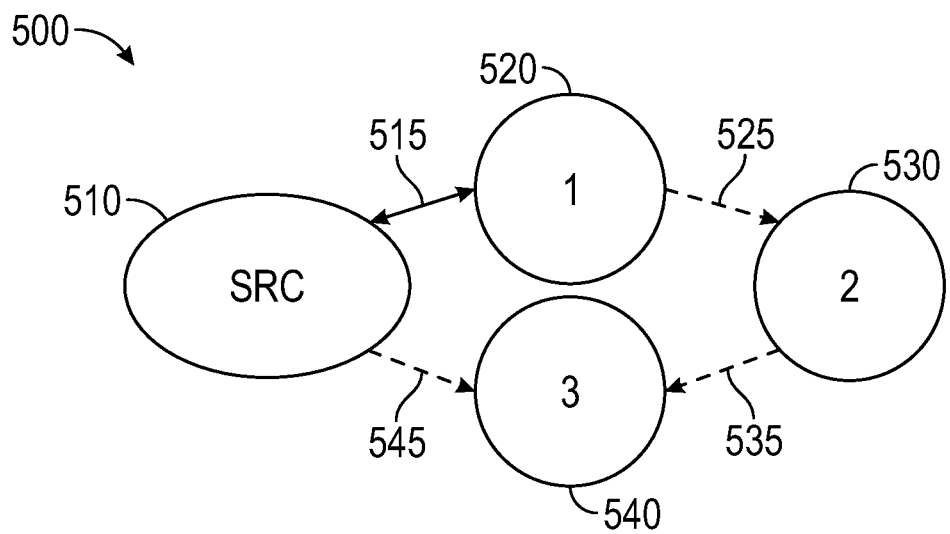
FIG. 5A and FIG. 5B depict unmappable node cases, in accordance with an embodiment of the present disclosure.
Figure 5B:
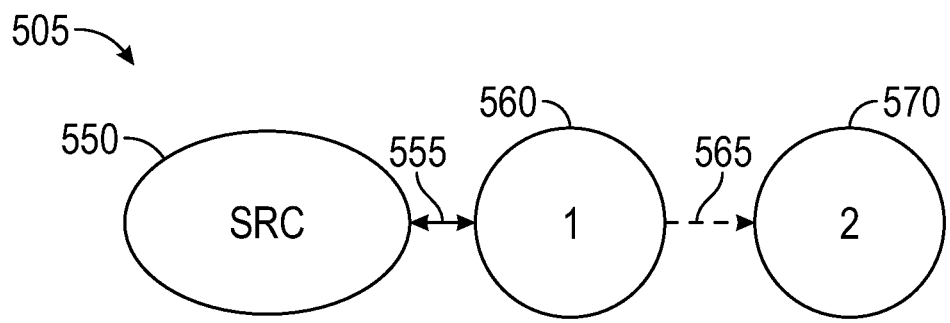

FIG. 5A and FIG. 5B depict unmappable node cases, in accordance with an embodiment of the present disclosure. In network 500 of FIG. 5A, source host 510 ("SRC") is coupled to origination node 520 via bidirectional link 515, and to third node 540 via outgoing monodirectional link 545. Second node 530 is coupled to origination node 520 (its parent) via incoming monodirectional link 525, and to third node 540 via outgoing monodirectional link 535.

Network 500 is similar to network 400 of FIG. 4, except that bidirectional link 445 between source host 410 and third node 440 has been replaced by monodirectional link 545. Third node 540 now does not support a path to source host 510 for second node 530. With no path available to source host 510, second node 530 is now unmappable.

In network 505 of FIG. 5B, source host 550 is coupled to origination node 560 via bidirectional link 555. Second node 570 is coupled to origination node 560 via incoming monodirectional link 565. Once again, second node 570 has no path available to source host 550 and is therefore unmappable. In either case, network 500 or network 505, the source host will not see the second node.

According to an embodiment, to make the network graph generated by the assessor tool verbose enough to distinguish between the stages of the enumeration process present at each node, a plurality of states are defined. Nodes maintain their present status in, e.g., a simple "flag" file stored in memory or on disk that contains a single byte that represents the state of the node. For simplicity and clarity of a user interface, states are also mapped to identifiers or indicators, e.g., colors, icons, hatching and shading, etc.

Figure 6:
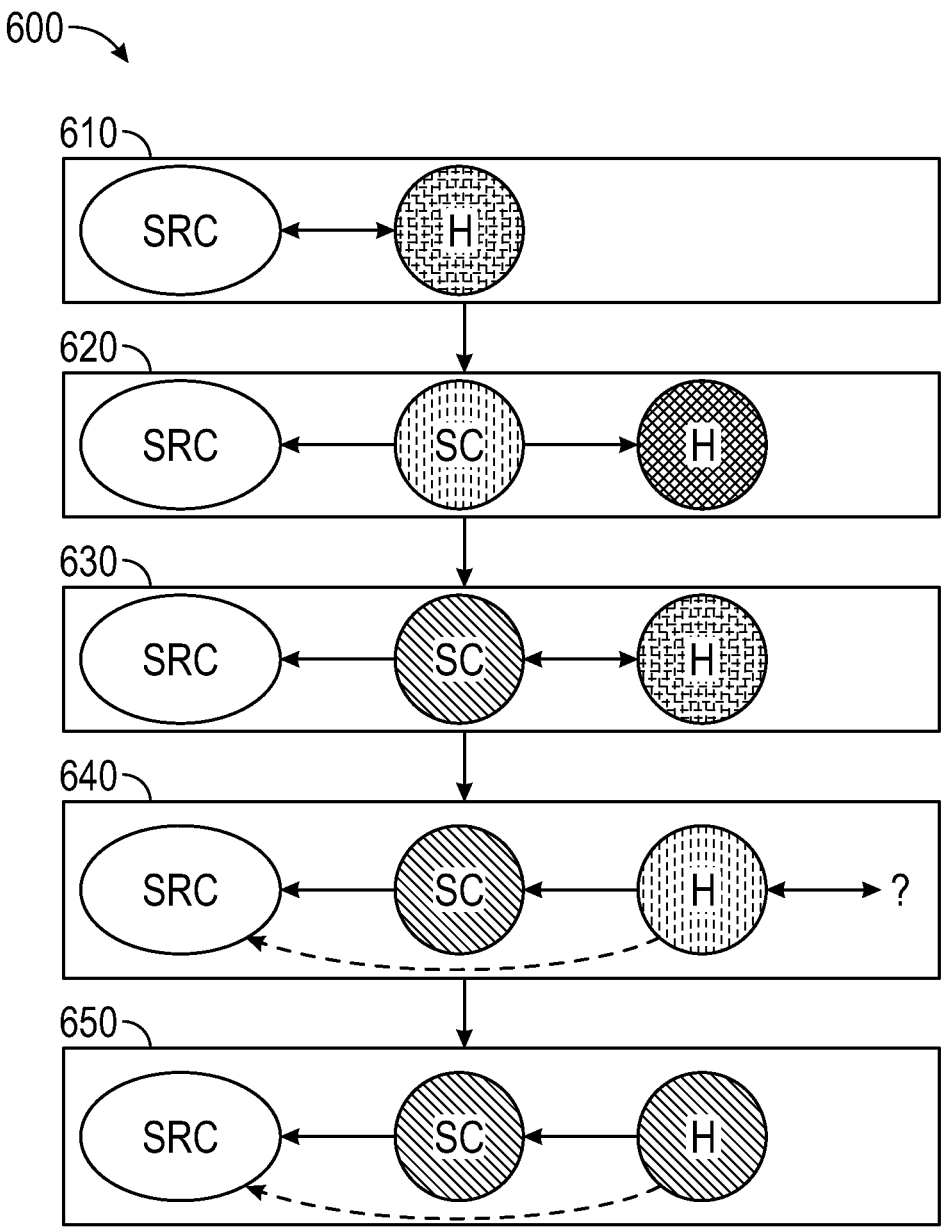
FIG. 6 depicts a network scanning flow diagram, in accordance with an embodiment of the present disclosure.

FIG. 6 depicts network scanning flow diagram 600, in accordance with an embodiment of the present disclosure. The network scanning of flow diagram 600 may, for example, produce data usable for network infrastructure assessment. In this example, the network consists of two nodes with only bidirectional links. The arrows within each element of flow diagram 600 (i.e., within 610, 620, 630, 640 and 650) represent the flow of data at each element.

At 610, a source host (SRC) replicates an assessor tool and places it at a host (H). The host enumerates information internally, updates its internal status, and sends information to the source host as it is enumerated. At 610, the host may be in an "Internally Scanning" state. Flow then moves to 620.

At 620, the host begins scanning for other hosts on all interfaces. It discovers a new host (H), becomes its parent, or subcontroller (SC), replicates the assessor tool and places the assessor tool at the new host. (The new host is now the child of the subcontroller.) Information, e.g., on the discovery of the new host, is reported to the source host. At 620, the subcontroller may be in an "Externally Scanning" state and the new host may be in an "Cannot query/Unreachable" state. Flow then moves to 630.

At 630, the new host begins internal enumeration and communicates data with its subcontroller (the host). At the subcontroller (host), external scans are complete and the node is marked as complete. At 630, the subcontroller may be in a "Completed/Listening Only" state and the new host may be in an "Internally Scanning" state. Flow then moves to 640.

At 640, the new host completes enumeration and begins external scans. The new host communicates its status and scan data to its subcontroller which, in turn, reports the updates from the new host to the source host. (Alternatively, the new host may report the updates to the source host directly.) At 640, the subcontroller may be in a "Completed/Listening Only" state and the new host may be in an "Externally Scanning" state. Flow then moves to 650.

At 650, the new host completes (external) scanning and marks itself complete. The new host updates the subcontroller, which then updates the source host. (Alternatively, the new host may report the updates to the source host directly.) With all hosts in the network complete, the source host marks the network scan as complete, and retains data usable for network infrastructure assessment. The cleanup process is then started. At 650, the subcontroller may be in a "Completed/Listening Only" state and the new host may be in a "Completed/Listening Only" state.

One possible list of node states could include completed/listening only, externally scanning, internally scanning, skipped/out-of-scope, and unreachable or potentially-malicious host states. New states and corresponding identifiers can, of course, be introduced as desired.

From the perspective of the source host, new nodes and links are added to the existing graph as they are discovered. In the case of a new link created to an un-enumerated node from an existing node that has completed externally scanning, the existing code on the existing node monitors changes in network interface statuses and initializes mapping of the new node, if possible. If a collection of nodes inside the network can no longer communicate to the source host, then the graph retains information, but the nodes are assigned a secondary status of "unreachable" with a secondary identifier (e.g., colored gray) until communication is either reestablished, or a time determined by the operator (preset in runtime parameters) has elapsed. On elapse of the preset time, code running on isolated nodes terminates and cleanup is initiated.

According to an embodiment, node discovery on network interfaces is done using ICMP (Internet Control Message Protocol) echo/timestamps ("pinging"), ARPing (sending a request via the Address Resolution Protocol method), or TCP/UDP (Transmission Control Protocol/User Datagram Protocol) socket connection requests, etc. Once a node is discovered, open ports/sockets are enumerated. If a hosts file or baseline scan is provided (i.e., if the assessor tool is in service configuration), all nodes are imported and then verified using the initial access vector from the provided scan. If the initial access vector is not present, other sockets are enumerated for remote access. The source host contains a variety of service fingerprints to determine if a port is usable for remote access. (Service fingerprints are different port protocols.) As ports are discovered, they are sent to the source host where service and/or operating system fingerprinting is initiated. If a service with remote access is successfully fingerprinted, a signal will be sent to the code on that node to attempt remote access. Successes are reported back to the controller, and to adjacent nodes. Failures are ignored unless specifically requested for verbosity.

Collection of service (and operating system) fingerprints is used to validate a host, i.e., to determine if a host is what it says it is. This reduces the possibility of a malicious host spoofing identities and accessing credentials through authentication attempts. Once the host is validated, a TLS (Transport Layer Security) proxy to the host, using local access, is established.

There are also criteria that must be fulfilled before marking a node as unreachable. The first criterion is that no alternative paths to the source host have been discovered yet. If an alternative path is found after a time, the code on the node will simply update its parent node and publish any new statuses since disconnecting.

The code replicated on each node maintains contact with its parent node from time to time over the TLS proxy, by either publishing a status (e.g., upon a change of status), or by sending a "heartbeat" message from time to time to the parent node. In an instance where neither of these can occur, the parent node can query the child node for its status. In certain embodiments, an isolated node is marked as unreachable after three unsuccessful queries; this number may be set by a runtime parameter. The isolated node will continue scanning any of its child nodes in search of a route back to the source host until the predefined time limit is reached (also a runtime parameter).

One case of note is that isolating a node and then connecting it to a different node in the network will result in two links to be shown in the graph on the source host. To reduce load throughout the network, link verification is limited to status querying and publishing for each node.

During runtime, the source host needs to determine if the network is completely mapped. Latencies can be a problem as the status updates may be in route to the source host but not yet parsed. In other words, the code on the child node has been started but has yet to respond to the source host. Alternatively, high communication or computation latency may make some nodes appear "unreachable." If the operator makes certain assumptions about the network, then the source host can determine the completeness of a scan. For example, the operator can determine the number of propagation steps from the source host, the operator can set a time limit, etc. These operator assumptions can be utilized in runtime parameters provided to the initial source host. If the network is truly unknown, trial and error can be used, or the operator can initiate a cleanup process.

The cleanup process is relatively simple. This is because all information such as the code, status/flag files, temporary files, etc. is stored in memory only. This allows the code to either delete the files by source host request or to instigate a reboot. In the case where code is running on a node that later becomes isolated from the source host initiating the "kill" (start cleanup) signal, code running on the nodes can be cleared via reboot after passage of a preset time from the runtime parameters. The nodes can also be manually cleared by reboot or power-cycle. For operating systems like OpenBSD, which can maintain files in temporary filesystem directories between reboots, a remove command (e.g., rm -rf) may be propagated prior to reboot for redundancy. According to an embodiment, when propagating the cleanup signal, code will execute cleanup in a LIFO (Last-In-First-Out) manner. This ensures that code on a node will not delete itself until all its child nodes are cleared or unreachable. For unreachable child nodes, code on other nodes preferably will attempt to signal retransmission multiple (e.g., three) times before giving up. (Other numbers of repetition can be used depending on the type of network.) Signals are propagated to all adjacent nodes for all links in the network as well. This ensures maximum coverage in case of network latencies.

As output, the data collected by the initial source host can be displayed as a graph of nodes. Preferably, nodes are mapped using colors to define their state (status), although other methods, e.g., icons, hatching and shading, etc., also are contemplated. Nodes and links are also assigned sizes depending on their weights. Node weights can be given a specific weighting formula by the operator, but in many cases, it is enough to weight the node based on ratios of average versus total CPU usage, disk usage, memory utilization, and the like. Larger nodes indicate a higher ratio, which may indicate to the operator that the node is a bottleneck in the network. For links between nodes, the weight is simply the bandwidth of the traffic across the link. Higher bandwidth can be indicated by a thicker line, a change of line color, etc.

Node shapes can represent the type of device in the network. For example, a generalized node can be a circle, a switch can be a square, and a virtual machine can be a triangle.

Figure 7A:
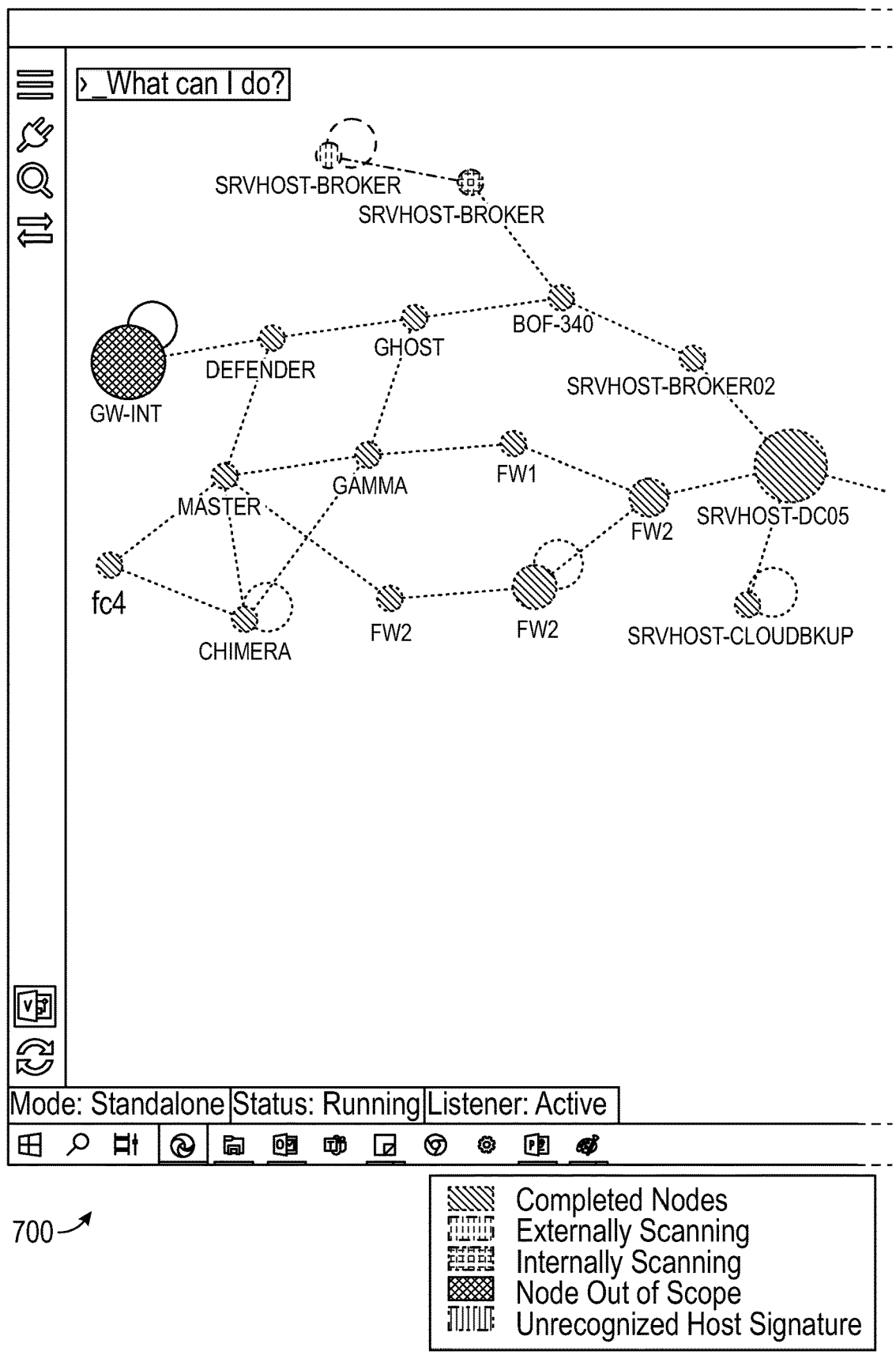
FIG. 7A and FIG. 7B depict an example network graph, in accordance with an embodiment of the present disclosure.
Figure 7B:
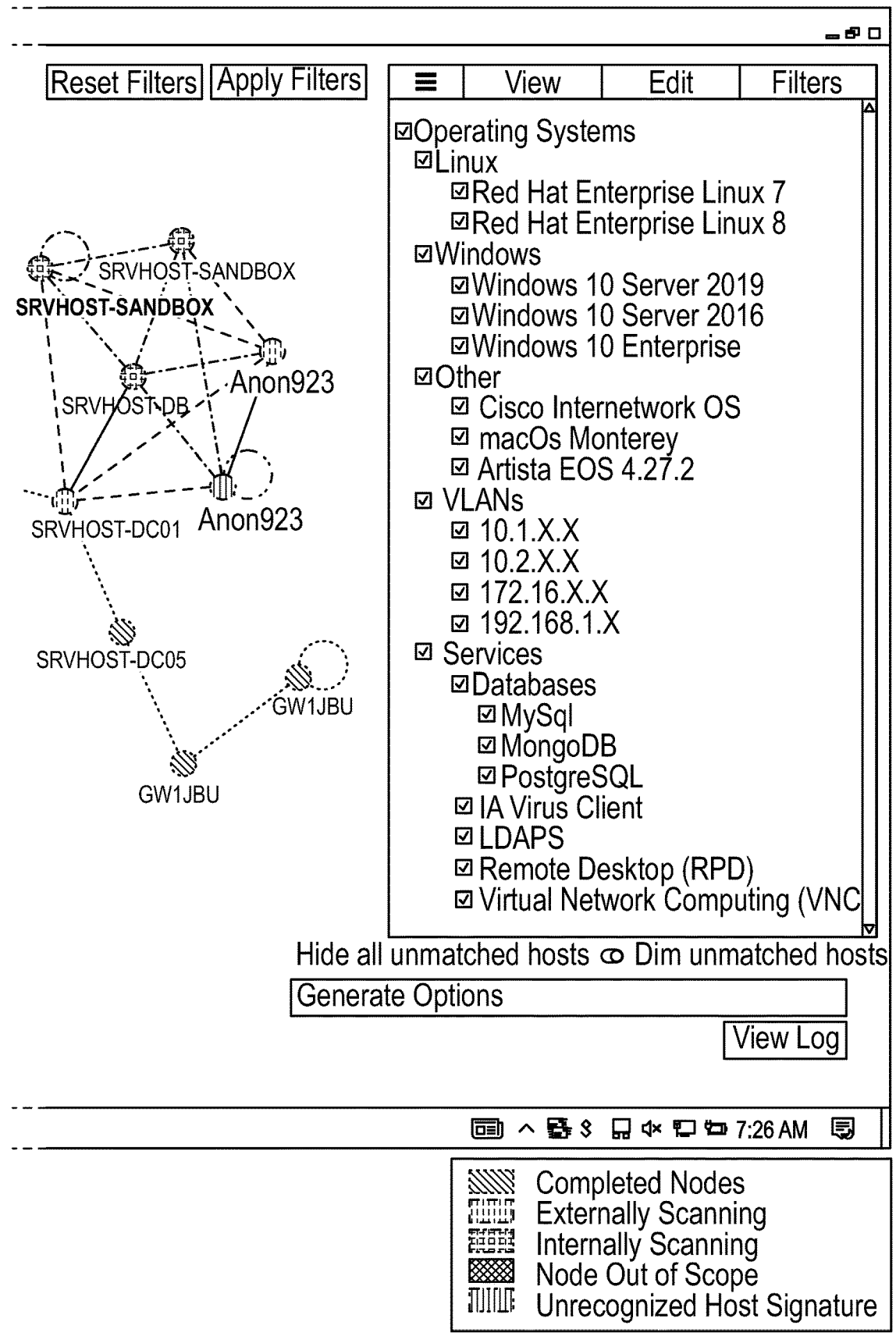

One example of using enumerated information to produce a network infrastructure assessment is the making of a network graph. FIG. 7A and FIG. 7B depict example network graph 700, according to an embodiment. In example network graph 700, there are state/status indicator mappings assigned to nodes that are defined as completed, externally scanning, internally scanning, out-of-scope (identified by the operator), or unrecognized states. Note that all or part of the assessor tool may update example network graph 700 using updated enumerated information.

Nodes in an unrecognized/unscannable state can mean two different things: a malicious host is on the network, or the scan parameters were not configured properly. Assuming the source host contains all necessary credentials for the network, no node should be unscannable. In an instance where the controller is misconfigured, a node may be falsely identified as "malicious" and, e.g., colored red. The assessor tool can be implemented to allow the operator to choose to rescan such nodes after updating the scan configuration. An update that would deal with the false-positive malicious host is where the operator adds the credential for the node or the node signature to the runtime parameters to ensure that the falsely identified node is not flagged in the future. (A node signature is a collection of data from a node organized in a way that indicates a node as unique or categorizable.)

For nodes that are truly unscannable and do not have any remote access vectors, the operator has the option to manually start the assessor tool on a child node by means of media or network transfer from the controller/origination node, or by running the assessor tool in service mode and configuring the host properly. Otherwise, these nodes may be identified as unscannable and, e.g., marked red.

According to an embodiment, the assessor tool may be used in one of two configurations: either standalone for network mapping as described above, or as an ongoing service. The major difference in these configurations is that the service configuration takes additional input in the form of a known baseline (i.e., a previous scan), or a list of characteristics (e.g., known IP and/or serial addresses, hosts, node signatures, etc.) of at least one node in the network. (In the present disclosure, the term "list of characteristics" is to be interpreted as, "any collection or grouping, with or without structure or order, of characteristics.") Baselined nodes that do not match the input parameters, or meet the unrecognized/unscannable criteria as described above, are identified as unscannable and marked for operator review by, e.g., being marked red.

Because the assessor tool accepts serial as well as IP addresses, the tool can scan a switch or other device having child nodes that do not use IP addresses, while operating within the constraints of the TTY connection.

According to an embodiment, information obtained from utilizing the assessor tool can be exported and stored in a backend database that can be created using many different database systems such as MariaDB, MySQL, or the like. The backend database may be in the network, at the controller (source node), or elsewhere.

According to an embodiment, key data that would be enumerated by default are listed in Table 1. Operators can specify shell commands to enumerate custom information or select options from a list.

TABLE 1

Key and example optional enumerated scan data.

| Key Data | Example Optional Data |
|---|---|
| Node State | Database Tables |
| Parent Node | Web server configs |
| Hostname | Users/Permissions |
| Network Interfaces/VLANs | Output of operator-defined scripts |
| Adjacent Nodes | |
| Running Services/Listening IP & Port | |
| Operating System/Kernel Info | |
| Firewall Rules/ACLs | |
| Active hardware ports | |

According to an embodiment, the assessor tool can run with several additional options such as headless mode or read-only mode. Headless mode builds the internal database so it can be re-imported into the assessor tool in read-only mode to build the graph. One advantage of headless mode is that computations and libraries needed to visualize the graph are not used, which greatly reduces the size of the program. Headless mode is also an effective way to containerize the assessor tool. According to an embodiment, read-only mode is the default mode of the assessor tool if an existing completed scan is opened for viewing (rather than importing an existing scan into a new scan). Read-only mode has limited functionality to perform only analysis tools/plugins, and post-processing modules such as data exportation.

According to an embodiment, the assessor tool has a plugin engine integrated that allows the operator to execute user-defined tasks in real time. These tasks or queries do not have to be predefined and will be allowed to run if the code does not interfere retroactively with enumeration of key data as defined in Table 1. For example, a plugin to allow the operator to execute a subset of shell commands to specific hosts or switches may allow the operator to isolate and troubleshoot cyber-related issues in real-time. While running, one embodiment can allow the operator to monitor the network in real-time and execute commands to fully enumerated nodes.

According to an embodiment, after the completion of a scan, data stored in the backend database will be exportable for later viewing. This allows previous scans to be used as a baseline when the assessor tool is running in its service configuration. Additionally, post-processing plugins may be added to the plugin engine which allows data to be filtered and exported into formats needed by the operator or other tools.

Figure 8:
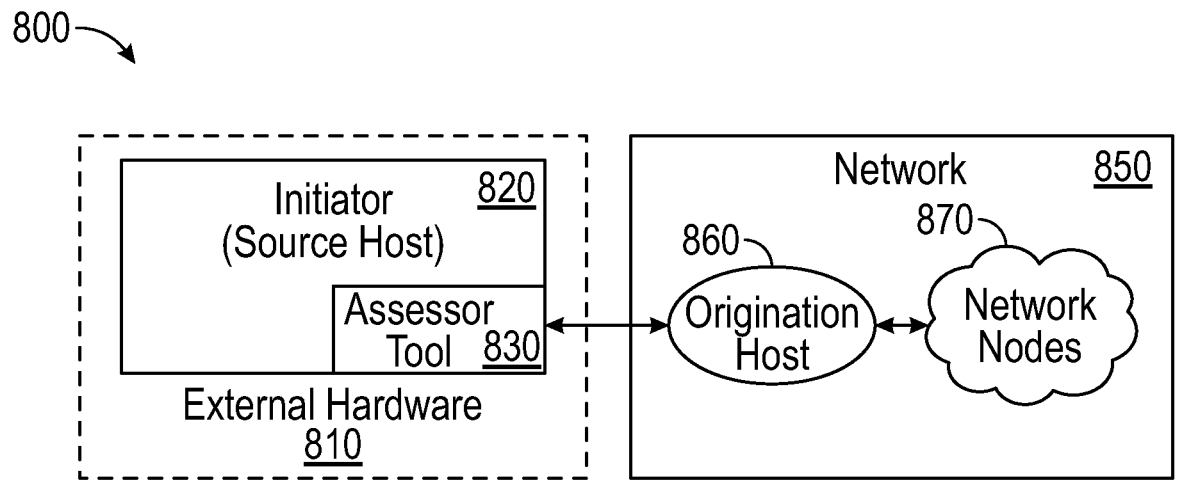
FIG. 8 depicts a system in which an assessor tool is used for network infrastructure assessment, in accordance with an embodiment of the present disclosure.

FIG. 8 depicts a system 800 in which an assessor tool is used for network infrastructure assessment, in accordance with an embodiment of the present disclosure. System 800 includes network 850 and external hardware 810. Network 850 includes origination host 860 and network nodes 870. Origination host 860 is coupled to network nodes 870 and is connected to one or more nodes of network nodes 870 via a wired and/or wireless connection. Generally, the nodes of network 850 are coupled via wired and/or wireless connections. Generally, wired and/or wireless connections may include one or more wired communications interfaces or protocols, such as USB (Universal Serial Bus), Ethernet™, etc., and/or one or more wireless communications interfaces or protocols, coupled to one or more antennas, such as Wi-Fi™, Bluetooth™, cellular, etc.

External hardware 810 includes initiator (source host) 820 and assessor tool 830 at initiator 820. Assessor tool 830 is coupled to origination host 860 via a wired and/or wireless coupling. External hardware 810 includes one or more general-purpose or application-specific microprocessors that executes instructions to perform control, computation, input/output, etc. functions for initiator 820, and may be, e.g., a laptop, smartphone, or other computing device. External hardware 810 may include a single integrated circuit, such as a micro-processing device, or multiple integrated circuit devices and/or circuit boards working in cooperation to accomplish the functions of initiator 820.

Operation of assessor tool 830 is initiated by initiator 820. Initiator 820, if connected directly to a host, also may auto-discover and choose the host as origination host 860, if given proper credentials in the runtime parameters. Otherwise, initiation may require a manual configuration of what host to originate from using the runtime parameters. This may be used, e.g., when the initiator is connected to a hub, a switch, etc.

The certificate authority certificate may be stored on initiator 820 or a device coupled to it, and may be, e.g., a newly-generated key (for standalone mode), or a pre-generated key (for service mode). Initiator 820 may provide the root authentication key to assessor tool 830.

For security reasons (e.g., sniffing/spoofing/fuzzing attacks), the operator may elect to not run the assessor tool when the tool is connected to the public Internet, unless it is configured properly in service mode only. Among other vulnerabilities, traffic signatures and statistics may yield information to a potential attacker such as which host may be the present controller, what hosts are actually online/reachable, etc.

Figure 9:
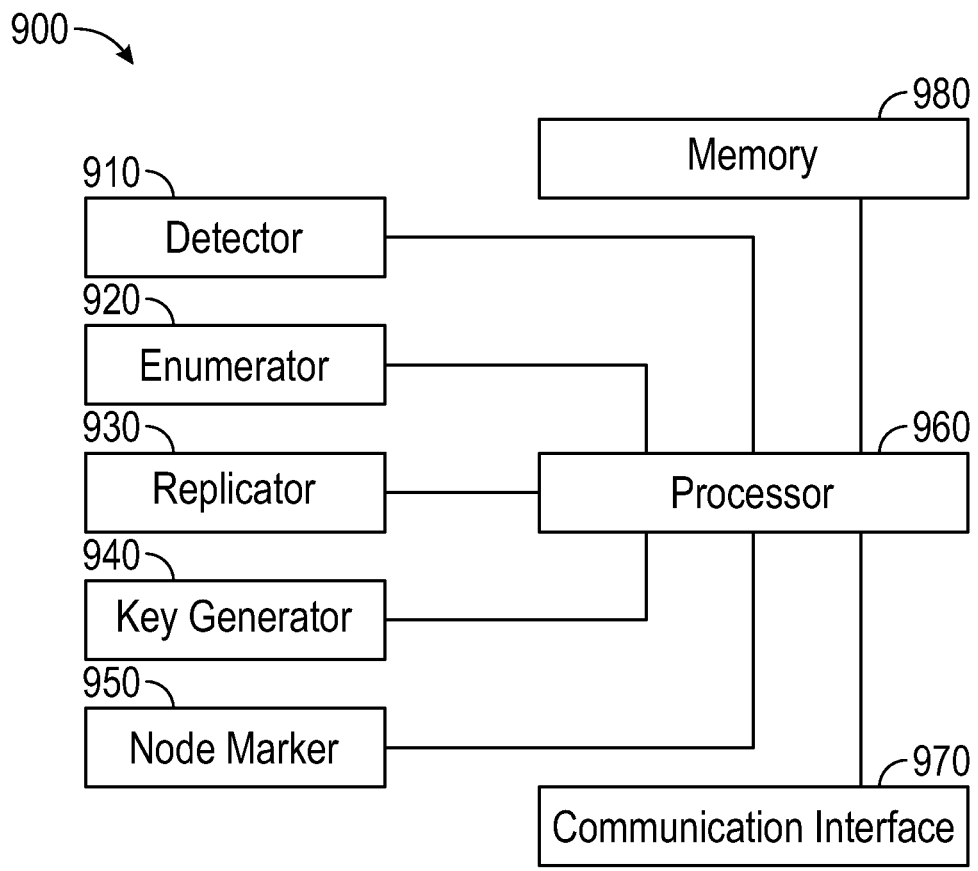
FIG. 9 depicts a block diagram of an assessor tool, in accordance with an embodiment of the present disclosure.

FIG. 9 depicts a block diagram of an assessor tool 900 usable for network infrastructure assessment, in accordance with an embodiment of the present disclosure. Assessor tool 900 may be assessor tool 830 at initiator 820, as shown in FIG. 8. At least a portion of assessor tool 900 may also be at origination host 860 and network nodes 870. In assessor tool 900, detector 910 is coupled to processor 960. Detector 910 is, e.g., a module configurable to detect adjacent child nodes in a network. Enumerator 920 is coupled to processor 960. Enumerator 920 is, e.g., a module configurable to enumerate and report information from its host. Replicator 930 is coupled to processor 960. Replicator 930 is, e.g., a module configurable to replicate at least a portion of assessor tool 900. Key generator 940 is coupled to processor 960. Key generator 940 is, e.g., a module configurable to generate a plurality of authentication keys associated with a root authentication key. Node marker 950 is coupled to processor 960. Node marker 950 is, e.g., a module configurable to mark its host as being enumerated.

Communication interface 970 is coupled to processor 960. Communication interface 970 may be a wired and/or wireless interface, configurable to communicate with controller 820 and/or other portions of external hardware 810, origination host 860 and network nodes 870 (as shown in FIG. 8), etc. via one or more local area networks, wide area networks, the internet, etc., and may execute various network protocols, such as, for example, wired and/or wireless Ethernet™, Bluetooth™, etc. Communication interface 970 may also include various combinations of wired and/or wireless physical layers, such as, for example, copper wire or coaxial cable networks, fiber optic networks, Bluetooth wireless networks, Wi-Fi™ wireless networks, CDMA (Code Division Multiple Access), FDMA (Frequency Division Multiple Access), and TDMA (Time Division Multiple Access) cellular wireless networks, etc. Communication interface 970 may also include communication via parallel or serial bus connections, e.g., USB (Universal Serial Bus), RS-232, etc.

Communication interface 970 may also be a user interface, configurable to, e.g., accept runtime parameter inputs from an operator and, e.g., display or otherwise output processed and/or unprocessed network infrastructure information.

Processor 960 includes one or more general-purpose or application-specific microprocessors that executes instructions to perform control, computation, input/output, etc. functions for assessor tool 900. Processor 960 may include a single integrated circuit, such as a micro-processing device, or multiple integrated circuit devices and/or circuit boards working in cooperation to accomplish the functions of processor 960. In addition, processor 960 may execute computer programs or modules stored within memory 980.

Memory 980 is coupled to processor 960. Generally, memory 980 stores instructions for execution by processor 960 and data. Memory 980 may include a variety of non-transitory computer-readable media that may be accessed by processor 960. In various embodiments, memory 980 may include volatile and nonvolatile media, non-removable media and/or removable media. For example, memory 980 may include any combination of RAM (random access memory), DRAM (dynamic RAM), SRAM (static RAM), ROM (read-only memory), flash memory, cache memory, and/or any other type of non-transitory computer-readable medium.

In one embodiment of the assessor tool, the assessor tool is configured to replicate at least a portion of the assessor tool on an origination node of the plurality of nodes of the network, the origination node being a parent node of the plurality of nodes, and to generate by the portion of the assessor tool on the origination node a plurality of authentication keys associated with the root authentication key; recursively, for one or more nodes of the plurality of nodes, to enumerate information on the parent node and report the enumerated information to a controller of the network associated with an oldest enumerated node of the network and to one or more adjacent nodes of the parent node, to mark the parent node as enumerated, to detect child nodes connected to the parent node, responsive to a determination that a child node is not enumerated, and that the child node possesses a valid child authentication key associated with at least one of the plurality of authentication keys, replicate the at least a portion of the assessor tool on the child node and continue recursion with the child node as the parent node; and to process at least a portion of the enumerated information to produce an infrastructure assessment of the network.

Embodiments of the present disclosure advantageously provide a method and tool for assessing network infrastructure. The embodiments described above are combinable.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation. The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for network infrastructure assessment, the method comprising:

replicating at least a portion of an assessor tool on an origination node of a plurality of nodes of a network, the origination node being a parent node of the plurality of nodes and configured to generate a plurality of authentication keys associated with a root authentication key;

recursively, for one or more nodes of the plurality of nodes:

the assessor tool enumerating information on the parent node and reporting the enumerated information to a controller of the network associated with an oldest enumerated node of the network and to one or more adjacent nodes of the parent node;

marking the parent node as enumerated;

detecting child nodes connected to the parent node;

responsive to a determination that a child node is not enumerated, and that the child node possesses a valid assigned authentication key associated with at least one of the plurality of authentication keys, replicating at least a portion of the assessor tool on the child node and continuing recursion with the child node as the parent node; and processing at least a portion of the enumerated information to produce an infrastructure assessment of the network.

2. The method of claim 1, the assessor tool configured in a service mode in which an existing security credential is present on the parent node and the method further comprising:
generating at least one authentication key of the parent node based at least in part on the existing security credential.

3. The method of claim 2, where, in the service mode, the method further comprising building a network graph of the network using at least a portion of the enumerated information.

4. The method of claim 1, wherein the assessor tool is configured in a standalone mode and the method further comprising:
forwarding a security credential to the parent node; and
generating at least one authentication key of the parent node based at least in part on the forwarded security credential.

5. The method of claim 1, where replicating at least a portion of the assessor tool on the child node provides the child node with an address of the controller, further comprising each child of the one or more nodes reporting associated enumerated information to the address of the controller.

6. The method of claim 1, further comprising:
determining a service fingerprint of the child node and, responsive to a determination that the service fingerprint is of a service having remote access, attempting remote access of the child node using the service.

7. The method of claim 1, further comprising:
providing a known network baseline; and
responsive to a determination that the enumerated information differs from the known baseline, marking the parent node for operator review.

8. The method of claim 7, where the known baseline is at least one of a previous mapping of the network and a list of characteristics of at least one of the plurality of nodes.

9. The method of claim 1, further comprising operating the assessor tool in at least one of a headless mode and read-only mode.

10. The method of claim 1, where the determination that the child node possesses a valid authentication key is made before an expiration time of said key.

11. The method of claim 1, further comprising:
marking the parent node as complete after enumeration;
marking each child node connected to the parent node as complete; and
reporting said marking the parent node to at least one of the controller, a parent node, and one or more adjacent nodes of the parent node.

12. The method of claim 1, where if no child nodes of the parent node are detected, the parent node is a child node of the network.

13. The method of claim 12, further comprising:
marking the child node as complete; and
reporting said marking to at least one of the controller, the parent of the child node, and one or more adjacent nodes of the parent node.

14. The method of claim 1, where a network graph of the network includes a plurality of states of at least one enumerated node of the one or more nodes of the network.

15. The method of claim 14, the method further comprising mapping the plurality of states of at least one enumerated node to one or more indicators of a user interface.

16. The method of claim 14, where the plurality of states of the at least one enumerated node are stored on at least one of the network and an external database.

17. The method of claim 14, where the plurality of states include at least one of completed, listening only, externally scanning, internally scanning, skipped/out-of-scope, and unreachable or potentially-malicious host.

18. The method of claim 1, wherein the child node maintains contact with its parent node by at least one of publishing a status and sending a message from time to time to the parent node.

19. The method of claim 1, where processing the enumerated information external of the network includes building a network graph of at least a portion of the network using the enumerated information, the network graph having a plurality of states of at least one enumerated node of the one or more nodes of the network.

20. The method of claim 19, further comprising updating the network graph using updated enumerated information.

21. The method of claim 1, further comprising coupling an initiator device external to the network wherein the initiator device initiates the assessor tool, and provides the root authentication key to the assessor tool.

22. The method of claim 1, where the oldest enumerated node of the network is the origination node.

* * * * *